United States Patent
Goseki

(10) Patent No.: US 6,950,149 B1
(45) Date of Patent: Sep. 27, 2005

(54) COMB FILTER AND A VIDEO APPARATUS

(75) Inventor: Masami Goseki, Tokyo (JP)

(73) Assignee: Sony Corporation, Tokyo (JP)

(*) Notice: Subject to any disclaimer, the term of this patent is extended or adjusted under 35 U.S.C. 154(b) by 1163 days.

(21) Appl. No.: 09/706,432

(22) Filed: Nov. 3, 2000

Related U.S. Application Data

(63) Continuation of application No. 08/991,352, filed on Dec. 16, 1997, now abandoned.

(30) Foreign Application Priority Data

Dec. 21, 1996  (JP) .................................. 8-354924

(51) Int. Cl.[7] .............................................. H04N 9/78
(52) U.S. Cl. ..................................... 348/667; 348/668
(58) Field of Search ................................ 348/663, 664, 348/665, 666, 667, 668; H04N 9/78

(56) References Cited

U.S. PATENT DOCUMENTS

| | | | |
|---|---|---|---|
| 4,389,665 A * | 6/1983 | Nagao et al. ................ | 348/666 |
| 5,025,311 A * | 6/1991 | Hosoi ............................ | 348/668 |
| 5,216,494 A | 6/1993 | Matsui et al. .................. | 358/31 |
| 5,264,923 A * | 11/1993 | Bhang .......................... | 348/665 |
| 5,291,278 A * | 3/1994 | Nishigori ...................... | 348/665 |
| 5,325,182 A | 6/1994 | Murata et al. | |
| 5,367,342 A * | 11/1994 | Bang ............................ | 348/667 |
| 5,808,701 A | 9/1998 | Lee | |

FOREIGN PATENT DOCUMENTS

EP          0 322 890          7/1989

* cited by examiner

Primary Examiner—Michael H. Lee
(74) Attorney, Agent, or Firm—Frommer Lawrence & Haug LLP; William S. Frommer

(57) ABSTRACT

An adaptive comb filter small in circuit scale and simple in circuit constitution is provided. The frequency band component of chrominance signal is extracted from a composite color video signal by a bandpass filter. The extracted chrominance signal is delay by a delay circuit by one horizontal period. A subtraction output is obtained by a first subtracting circuit between the output signal of the bandpass filter and the output signal of the delay circuit. An addition output is obtained by a adding circuit between the output signal of the bandpass filter and the output signal of the delay circuit. A correlation detecting circuit is provided that outputs a binary signal k0 based on a relationship between the output of the first subtracting circuit and the output of the adding circuit. This binary signal k0 and a signal k1 obtained by delaying this binary signal k0 by a second delay circuit by one horizontal period are supplied to an arithmetic block. From an operational result between the signals k0 and k1, the arithmetic block outputs a select signal for performing switching control on a selector switch circuit that switches between the output of the bandpass filter and the output of the first subtracting circuit and outputs the switched output. Then, the arithmetic block obtains the chrominance signal from the selector switch circuit.

6 Claims, 5 Drawing Sheets

FIG. 2A
a 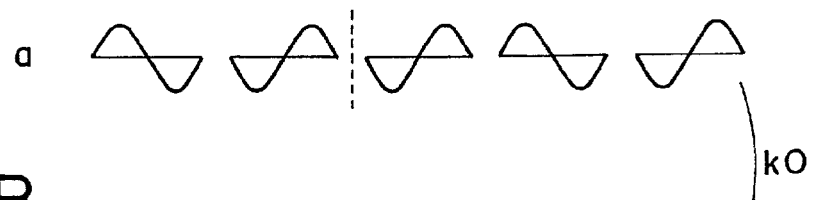 } k0
FIG. 2B
b
FIG. 2C
b+1H 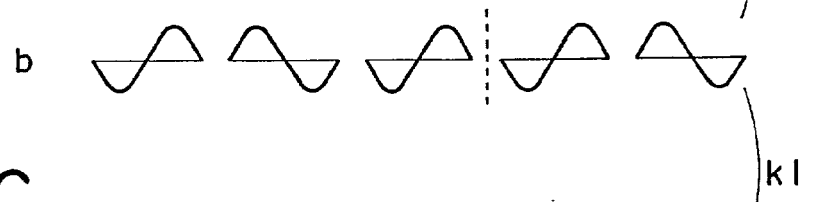 } k1
FIG. 2D
x 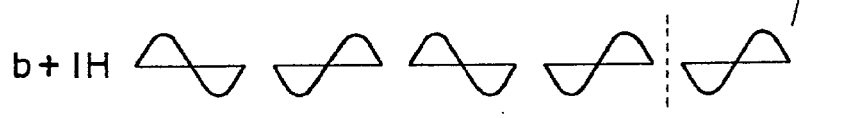
FIG. 2E
y 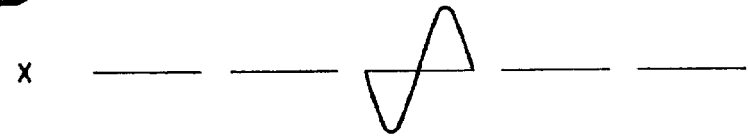
FIG. 2F
| k0 | 1 | 1 | 0 | 1 | 1 |
| k1 | – | 1 | 1 | 0 | 1 |
| SEL | – | 0 | 1 | 0 | 0 |
FIG. 2G
c 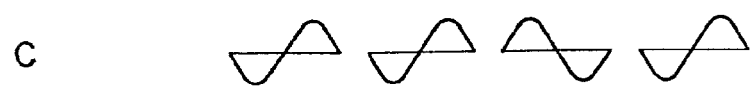

FIG. 4

[TABLE 1 : CORRELATION DETECTING BLOCK EVALUATION FORMULA]

| EVALUATION FORMULA | k0 |
|---|---|
| $|y|/N \geq |x|$ (N : INTEGER) | 1 |
| $|y|/N < |x|$ (N : INTEGER) | 0 |

FIG. 5

[TABLE 2 : ARITHMETIC BLOCK TRUTH TABLE]

| k0 | k1 | SEL |
|---|---|---|
| 0 | 0 | 0 |
| 0 | 1 | 1 |
| 1 | 0 | 0 |
| 1 | 1 | 0 |

FIG. 6

[TABLE 3 : RELATIONSHIP BETWEEN SIGNAL SEL AND OUTPUT SIGNAL SC]

| SEL | SC |
|---|---|
| 1 | A |
| 0 | B |

COMB FILTER AND A VIDEO APPARATUS

This application is a Continuation of prior application Ser. No. 08/991,352, filed Dec. 16, 1997 now abandoned.

BACKGROUND OF THE INVENTION

1. Field of the Invention

The present invention generally relates to a comb filter for separating a luminance signal and a chrominance signal from a composite color video signal to output the separated signals and, more particularly, to a video apparatus such as a color television receiver or a VTR that uses this comb filter.

2. Description of Related Art

Ordinarily, for a television receiver to obtain an output image from a received composite color video signal, a luminance signal and a chrominance signal must be separated from the composite color video signal. As for a VTR, an input composite color video signal is separated into a luminance signal and a chrominance signal and the luminance signal is frequency modulated and the chrominance signal is frequency converted to the low frequency side of the FM luminance signal for recording.

For a means to separate the luminance signal and the chrominance signal from the composite color video signal as described above, a comb filter has come to be frequently used that uses the correlation of the screen vertical direction of color video signal and the inversion of the phase of chrominance subcarrier every period. This is because separation of the luminance signal and the chrominance signal by use of a band filter such as a bandpass filter mixes a high-frequency component of the luminance signal included in the band of the chrominance signal into the chrominance signal to cause an image degradation known as cross color, whereas use of a comb filter prevents this cross color from occurring.

FIG. 8 is a block diagram illustrating a basic circuit constitution of the comb filter.

To be specific, a composite color video signal Sa including a luminance signal Y and a chrominance signal C inputted from an input terminal 11 is supplied to a delay circuit 12 of one horizontal period to be delayed by one horizontal period and the delayed signal is supplied to a first subtracting circuit 13. The composite color video signal Sa from the input terminal 11 is also supplied directly to the first subtracting circuit 13.

When a subtracting operation is performed in this subtracting circuit 13, the luminance signal component is canceled because of the vertical correlation of the video signal since the luminance the signals in adjacent horizontal intervals are almost the same. On the other hand, the phase of the color subcarrier is inverted every horizontal period, so that the color subcarrier components of the adjacent horizontal intervals come in phase in the subtracting circuit 13. As a result, only the chrominance signal component is obtained from the subtracting circuit 13. The chrominance signal component obtained from the subtracting circuit 13 is supplied to a bandpass filter 14 having a pass band of 3.58 MHz±500 kHz (in the case of NTSC signal) for example. From this bandpass filter 14, a chrominance signal C is taken to be sent to an output terminal 17C.

On the other hand, the composite color video signal Sa inputted through the input terminal 11 is supplied to a second subtracting circuit 16 via a delay circuit 15. The delay circuit 15 provides a timing match between the composite color video signal Sa and the chrominance signal C outputted from the bandpass filter 14. This delay circuit 15 provides a delay obtained by summing the delay of one horizontal period by the first delay circuit 12 and the delay provided by the subtracting circuit 13 and the bandpass filter 14.

To the second subtracting circuit 16, the chrominance signal C obtained by the bandpass filter 14 is supplied to be subtracted from the composite color video signal. Therefore, from the second subtracting circuit 16, a luminance signal Y is obtained to be sent to an output terminal 17Y.

Thus, according to the comb filter, the luminance signal Y and the chrominance signal C can be separated from the composite color video signal without causing a cross color.

However, if a composite color video signal in which a change is made from a horizontal scan line representing a uniformly flat screen content to a horizontal scan line representing a signal content in which the phase of chrominance signal is inverted is inputted in the above-mentioned comb filter, the scan line with the phase of chrominance signal inverted has no vertical correlation of the chrominance signal. Therefore, the chrominance component remains on the luminance signal Y at the output terminal 17Y in this scan line, thereby causing a so-called dot crawl.

In the chrominance signal sent to the output derived at the output terminal 17C, the signal level in the scan line concerned drops, thereby deteriorating the vertical resolution of chrominance signal.

To solve this problem, the applicant hereof proposed (in Japanese Non-examined Patent Publication No. Hei 3-70383 for example) a comb filter of adaptive type in which the vertical correlation between adjacent three lines is monitored and, between the lines having the vertical correlation, the luminance signal and the chrominance signal separated by the comb filter are used as outputs and, for the lines having no vertical relation, the luminance signal and the chrominance signal separated by the bandpass filter are used as outputs.

According to the above-mentioned proposition, for the scan lines having no vertical correlation with chrominance signal, the luminance signal and the chrominance signal separated by the bandpass filter are used as output signals to prevent a dot crawl from occurring.

In the above-mentioned adaptive comb filter, the vertical correlation of the video signal between three horizontal scan lines must be monitored. Therefore, as described in the above-mentioned publication, two delay circuits for delaying for delaying a composite color video signal for one horizontal period are used to generate a signal delayed behind the current input signal by one horizontal period and a signal delayed behind the current input signal by two horizontal periods to monitor the vertical correlation between the current input signal and the signal delayed by one horizontal period and the vertical correlation between the signal delayed by one horizontal period and the signal delay by two horizontal periods.

Thus, in the constitution of the ordinary adaptive comb filter, the two delay circuits of one horizontal period are required to delay the composite color video signal, thereby presenting a problem of comparatively increasing the circuit scale. In addition, this constitution must have the circuit for monitoring the vertical correlation between the current input signal and the signal delayed by one horizontal period and the circuit for monitoring the vertical correlation between the signal delay by one horizontal period and the signal delayed by two horizontal periods separately, thereby presenting a problem of complicating the circuit constitution.

SUMMARY OF THE INVENTION

It is therefore an object of the present invention to provide an adaptive comb filter that is smaller in circuit scale and simpler in constitution than the related-art filters.

In carrying out the invention and according to one aspect thereof, there is provided a comb filter comprising: a bandpass filter for receiving a composite color video signal, extracting a frequency band component of a chrominance signal from the composite color video signal, and outputting the extracted frequency band component; a first delay circuit for receiving the output of the bandpass filter and delaying the output by one horizontal period; a first subtracting circuit for obtaining a subtracted output between the output signal of the bandpass filter and an output signal of the first delay circuit; an adding circuit for obtaining an added output of the output signal of the bandpass filter and the output of the first delay circuit; a switching circuit for switching between the output of the bandpass filter and the output of the subtracting circuit and outputting the switched output; a correlation detecting circuit for receiving the output of the first subtracting circuit and the output of the adding circuit and, based on a relationship between the two outputs, outputting a binary signal that indicates correlation between the output signal of the bandpass filter and the output signal of the first delay circuit; a second delay circuit for delaying the binary signal coming from the correlation detecting circuit by one horizontal period; and an arithmetic circuit for receiving the binary signal from the correlation detecting circuit and the signal from the second delay circuit and, from an operational results of the binary signal and the signal from the second delay circuit, outputting a select signal for performing switching control on the switching circuit; wherein a chrominance signal is obtained from the switching circuit.

In the comb filter having the above-mentioned constitution according to the present invention, the frequency band component of a chromatic signal is extracted from a composite color video signal by the bandpass filter and the output signal of this bandpass filter is supplied to the first delay circuit to be delayed by one horizontal period. Then, the signal at the input/output terminal of this first delay circuit is subtracted by the first subtracting circuit to provide the chrominance signal from this first subtracting circuit.

The output signal of this first subtracting circuit is supplied to the correlation detecting circuit and the signal at the input/output signal of the first delay circuit is supplied to the adding circuit. The output signal of this adding circuit is also supplied to the correlation detecting circuit.

If the chrominance signal has vertical correlation, the chrominance signal is obtained at a comparatively large level as the output signal of the first subtracting circuit; as the output signal of the adding circuit, a comparatively small level output with the chrominance signal of two horizontal periods canceled is obtained.

Conversely, if the chrominance signal has no vertical correlation and the phase is antiphase for example, the output signal of the first subtracting circuit is set to a comparatively small level, while the output signal of the adding circuit is set to a comparatively large level.

The correlation detecting circuit detects the vertical correlation of the chrominance signal between two horizontal scan lines based on the above-mentioned relationship between the output of the first subtracting circuit and the output of the adding circuit and outputs the binary signal of the detection output.

The binary signal as the detection output of the presence or absence of this vertical correlation is supplied to an arithmetic circuit without change and, at the same time, to the arithmetic circuit via the second delay circuit. From these binary signals of the input/output of the second delay circuit, the arithmetic circuit obtains information about the vertical correlation between the three horizontal scan lines. Then, based on the relationship between the presence and absence of the vertical correlation between the three horizontal scan lines, the arithmetic circuit performs switching operation for switching between the output of the bandpass filter and the output of the first subtracting circuit and outputs the switched output.

In the above-mentioned example of the present invention, only one delay circuit, namely the first delay circuit, my be provided for delaying the signals in the chrominance signal band. And the second delay circuit for delaying the output of the correlation detecting circuit only delays the binary signal, so that its constitution is simple. Besides, the only one correlation detecting circuit may be provided for the signal component of the two horizontal scan lines of the input/output of the first delay circuit.

BRIEF DESCRIPTION OF THE DRAWINGS

These and other objects of the invention will be seen by reference to the description, taken in connection with the accompanying drawing, in which:

FIG. 2 is a timing chart for describing the operation of the preferred embodiment of FIG. 1;

FIG. 4 is a diagram for describing the preferred embodiment of FIG. 1;

FIG. 5 is another diagram for describing the preferred embodiment of FIG. 1;

FIG. 6 is still another diagram for describing the preferred embodiment of FIG. 1;

DETAILED DESCRIPTION OF PREFERRED EMBODIMENT

This invention will be described in further detail with reference to attached drawing by way of preferred embodiment in which a comb filter according to the invention is applied to a color television receiver.

Figure 3:
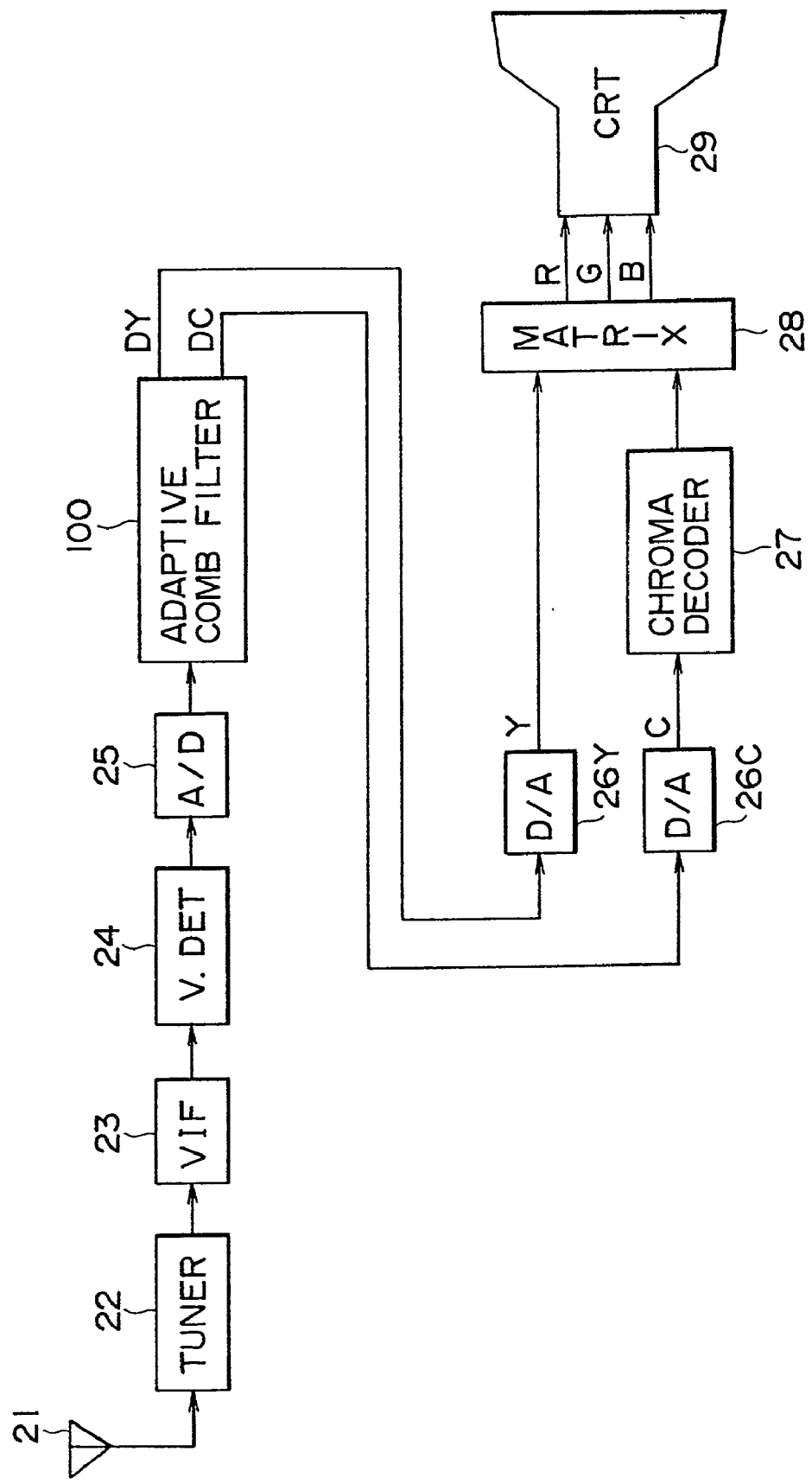
FIG. 3 is a block diagram illustrating a constitution of a color television receiver to which the comb filter according to the present invention is applied.
Figure 7:
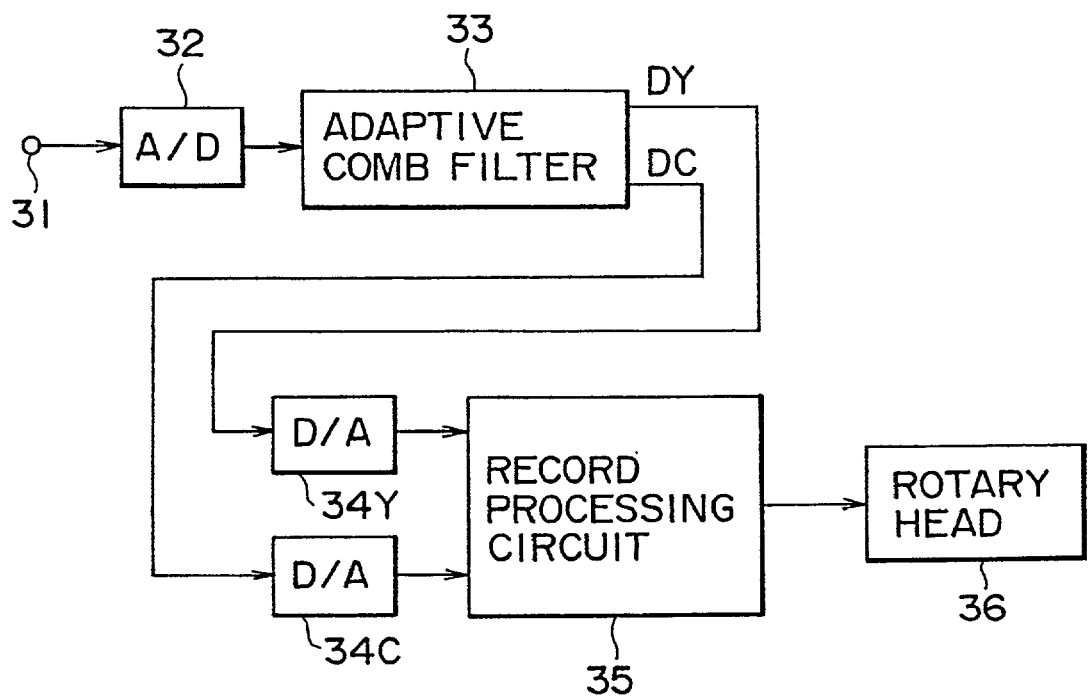
FIG. 7 is a block diagram illustrating a constitution of a VTR to which the comb filter according to the present invention is applied.
Figure 8:
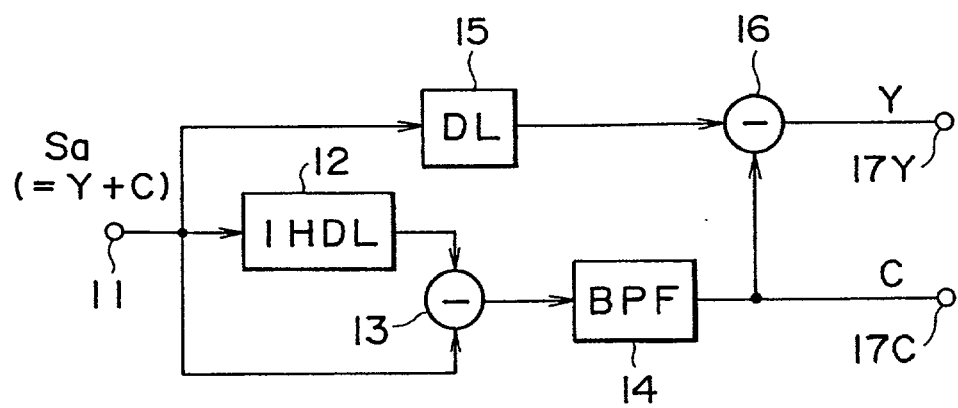
FIG. 8 is a diagram for describing a basic constitution of a ordinary comb filter.

First, referring to FIG. 3, a constitution of the color television receiver to which the comb filter of this preferred embodiment is applied will be outlined below.

A television broadcast signal received at a television antenna 21 is supplied to a tuner 22 and the broadcast signal of a channel selected by the user is converted into a video intermediate frequency signal. The resultant video intermediate frequency signal is supplied from the tuner 22 through a video intermediate frequency amplifier 23 to a video detector 24 where a composite color video signal is demodulated.

In this example, this composite color video signal is converted by an A/D converter 25 into a digital signal, which is supplied to an adaptive comb filter 100 to be described later to which the embodied comb filter is applied. In the adaptive comb filter 100, this digital signal is separated into a digital luminance signal DY and a digital chrominance signal DC. The digital outputs DY and DC of this comb filter 100 are supplied to D/A converters 26Y and 26C respectively to be returned to the analog luminance signal Y and the analog chrominance signal C respectively.

Then, the luminance signal Y is supplied to a matrix circuit 28 without change. The chrominance signal C is supplied to a chroma decoder 27 in which color difference signals R–Y and B–Y are decoded. These color difference signals R–Y and B–Y are supplied to the matrix circuit 28.

The matrix circuit 28 generates primary color signals R, G, and B from the luminance signal Y and the color difference signals R–Y and B–Y and supplies these generated signals R, G, and B to a color cathode ray tube 29 for image reproduction on the screen thereof.

Figure 1:
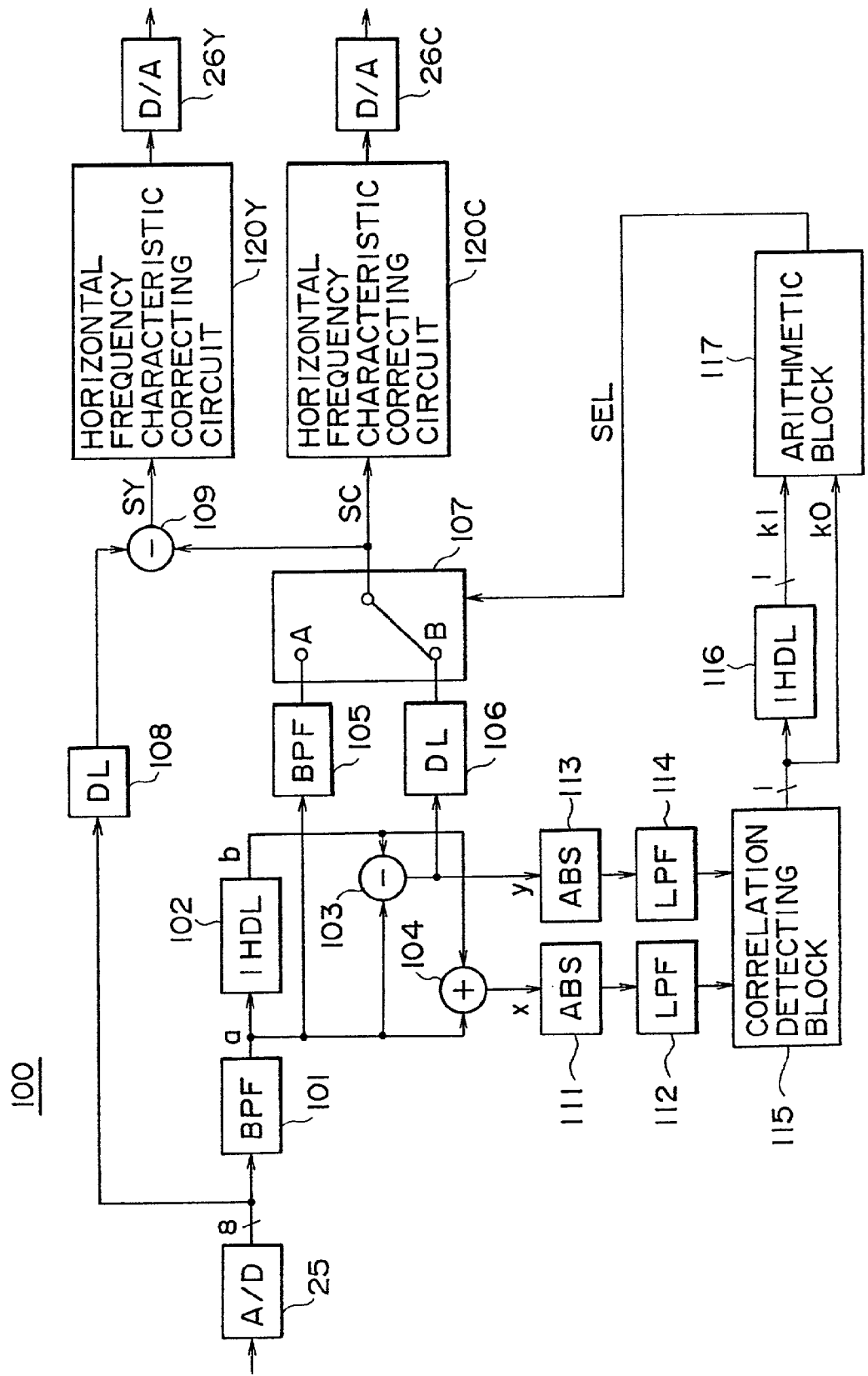
FIG. 1 is a circuit diagram illustrating a comb filter practiced as one preferred embodiment of the present invention.

The following describes the above-mentioned embodied comb filter with reference to FIGS. 1 and 2. FIG. 1 shows a circuit constitution of the embodied comb filter while FIG. 2 is a timing chart for describing a circuit operation of this comb filter.

As described above, the composite color video signal is digitized in the A/D converter 25. In this example, the composite color video signal is a digital signal of which sampling frequency is 4 fs (fs stands for color subcarrier frequency, which is about 3.58 MHz in NTSC) for example, being eight bits per sample. This digital composite color video signal is supplied to a bandpass filter 101, in which a frequency band component of the chrominance signal is extracted.

The output of the bandpass filter 101 is supplied to the first delay circuit 102 and delayed by one horizontal period. In this example, since the digital video signal has about 910 samples per one horizontal period and eight bit per one sample, the delay circuit 102 may be constituted by eight of 910 stages of registers transfered in order by a clock having a frequency of 4 fs.

Then, the output of the bandpass filter 101 and the output of the first delay circuit 102 are supplied to a first subtracting circuit 103 and an adding circuit 104 respectively. Since the output of the bandpass filter is a chrominance signal band component, the level of output y of the first subtracting circuit 103 and the level of output x of the adding circuit 104 correspond to the vertical correlation between the output of the bandpass filter 101 and the output of the first delay circuit 102.

If there is vertical correlation between the output of the bandpass filter 101 and the output of the first delay circuit 102, the chrominance signal output is obtained as the output of the first subtracting circuit 104 without problem. This output of the first subtracting circuit 104 is supplied via a delay circuit 106 to the input terminal B side of a selector switch circuit 107 for taking out a chrominance signal DC to be outputted. The delay circuit 106 matches the timing with a signal to be inputted in the input terminal A side of the selector switch circuit 107 and has a delay amount obtained by adding the delay in the first delay circuit 103 to the delay in a bandpass filter 105 to be described later.

To the input terminal A of the selector switch 107, the output of the bandpass filter 101 and the signal of the chrominance signal band limited by the bandpass filter 105 are supplied. The bandpass filter 105 performs band limitation for eliminating the luminance signal component from the output of the bandpass filter 101 and may be omitted from the circuit constitution.

The selector switch circuit 107 is operated by a select signal SEL generated depending on presence or absence of vertical correlation as described below.

The output x of the adding circuit 104 and the output y of the subtracting circuit 103 are supplied to absolute value circuits 111 and 113 respectively in which absolute values of these outputs are obtained. The outputs of the absolute value circuits 111 and 113 are supplied to lowpass filters 112 and 114 respectively to provide slowly changing signals |x| and |y|.

Then, the signals |x| and |y| from the lowpass filters 112 and 114 are supplied to a correlation arithmetic block 115. The correlation arithmetic block 115 executes an evaluating operation based on an evaluating expression shown in Table 1 of FIG. 4 and outputs a binary signal as the evaluation output, or a 1-bit evaluation signal k0.

In this case, if the vertical correlation between the output of the bandpass filter 101 and the output of the first delay circuit 102 is high, the output y of the subtracting circuit 103 becomes large than the output x of the adding circuit 104. Conversely, if the vertical correlation between the output of the bandpass filter 101 and the output of the first delay circuit 102 is low, the output x of the adding circuit 104 becomes larger than the output y of the subtracting circuit 103. The value of integer "N" in the evaluating expression of FIG. 4 is used to define the standard for determination of presence or absence of the vertical correlation. In this case, N=4 for example.

Namely, in this example, if the output level of the subtracting circuit 103 is larger enough than the output level of the adding circuit 104 for satisfying $|y|/4 \geq |x|$, it is determined that there is vertical correlation, thereby setting the evaluation signal k0 to "1." On the other hand, if the output level of the subtracting circuit 103 is small enough than the output level of the adding circuit 104 for satisfying $|y|/4 < |x|$, it is determined that there is no vertical correlation, thereby setting the evaluation signal to "0."

The evaluation signal k0 outputted from the correlation detecting block 115 is supplied to an arithmetic block 117 without change. The evaluation signal k0 outputted from the correlation detecting block 115 is also supplied to the arithmetic block 117 via the second delay circuit 116 as a signal k1 delayed by one horizontal period. In this example, this second delay circuit 116 may be a delay circuit for delaying the 1-bit evaluation signal k0 by one horizontal period and may be constituted by one of 910 stages of shift registers driven by a clock having a frequency of 4 fs.

In this case, the evaluation signal k0 indicates presence or absence of the vertical correlation in the chrominance signal between the currently inputted scan line and that one horizontal period before. The signal k1 indicates presence or absence of the vertical correlation in the chrominance signal between the scan line one horizontal period before and the scan line two horizontal periods before. Namely, the vertical correlation between the three horizontal scan lines can be known by the evaluation signals k0 and k1.

The arithmetic block 117 receives these evaluation signals k0 and k1, executes an operation that can obtain an operational result shown in Table 2 of FIG. 5, and generates the above-mentioned select signal SEL for the selector switch circuit 107 as the operational result. Table 3 of FIG. 6 shows a relationship between this select switch SEL and the switched state of the selector switch circuit 107. To be specific, if the signal SEL is "1," the selector switch circuit 107 is switched to the input terminal A side to select the output of the bandpass filter 105; if the signal SEL is "0," the selector switch circuit 107 is switched to the input terminal B side to select the output of the first subtracting circuit 103.

Therefore, according to the truth table shown in Table 2, if there is no vertical correlation in the chrominance signal between the currently inputted scan line and the scan line one horizontal period before and there is vertical correlation in the chrominance signal between the scan line one horizontal period before and the scan line two horizontal periods before, the selector switch circuit 107 selects the output of the bandpass filter 105; otherwise, the selector switch circuit 107 selects the output of the first subtracting circuit 103.

The following further describes the adaptive switching operation of the selector switch circuit 107 with reference to FIG. 2.

FIG. 2A shows the phase of the chrominance signal between the horizontal periods in the output a of the bandpass filter 101. In FIG. 2, five horizontal periods are shown. If the chrominance signal has vertical correlation, the phase of the chrominance signal is inverted every horizontal period. In the example of FIG. 2, the phase of the chrominance signal between the second horizontal period and the third horizontal period from the left side is inverted, indicating that there is no vertical correlation.

At this moment, the state between the horizontal periods in the output b of the first delay circuit 102 becomes a state shown in FIG. 2B. FIG. 2C shows a state in which the output is delayed further by one horizontal period (denoted by 1H in the figure).

In the adding circuit 104, addition is performed between the output a and the output b, so that the output x of the adding circuit 104 becomes as shown in FIG. 2D. If the output a has no correlation with the signal one horizontal period before, the output x becomes a signal of large level. In the first subtracting circuit 103, subtraction is performed between the output a and the output b, so that the output y of the first subtracting circuit 103 becomes as shown in FIG. 2E. If the output a has no correlation with the signal one horizontal period before, the output y becomes a signal of small level.

Therefore, the evaluation signals k0 and k1 obtained as a result of performing the operation of the above-mentioned evaluating expression of FIG. 4 become as shown in FIG. 2F. The output SEL obtained as a result of the operation according to the truth table of FIG. 5 performed in the arithmetic block 117 also becomes as shown in FIG. 2F.

Consequently, if the output y is selected by the selector switch circuit 107 when the output a has no correlation with the signal one horizontal period before, no proper chrominance signal shown in FIG. 2 can be obtained. On the other hand, according to the present invention, the selector switch circuit 107 selects the output of the bandpass filter 105, so that the proper chrominance signal as shown in FIG. 2G can be always outputted.

It should be noted that, in this example, as shown in the truth table of FIG. 5, if there is no vertical correlation in the chrominance signal between the scan line one horizontal period before and the scan line two horizontal periods before when there is no vertical correlation in the chrominance signal between the currently inputted scan line and the scan line one horizontal period before, the output of the bandpass filter 105 is not selected but the output of the first subtracting circuit 103 is selected. This is because to prevent the helical resolution from being deteriorated.

To be more specific, in a portion in which an image on the screen includes an oblique line, there is no vertical correlation in the chrominance signal between the currently inputted scan line and the scan line one horizontal period before and between the scan line one horizontal period before and the scan line two horizontal periods before. In this state, if the output of the bandpass filter 105 is selected as chrominance signal output, 3.58 MHz neighbor component of the luminance signal is included in the chrominance signal output, thereby causing cross color (dark and bright stripes). On the other hand, the luminance signal component is removed from the output of the first subtracting circuit 103. Therefore, in this example, if it is determined that there is no vertical correlation between the three horizontal scan lines, the output of the first subtracting circuit 103 is selected as the chrominance signal output to prevent cross color from being generated.

Thus, the digital chrominance signal SC obtained from the selector switching circuit 107 is supplied to a second subtracting circuit 109. At the same time, the digital composite color video signal coming from the A/D converter 25 is supplied to this second subtracting circuit 109 via a second delay circuit 108. The second delay circuit 108 matches the timing with the output timing of the chrominance signal SC coming from the selector switch circuit 107 and has a delay amount obtained by addition of the delay amount of the bandpass filter 101, the delay amount of the first subtracting circuit 103 and the delay amount of the delay circuit 106.

The second subtracting circuit 109 subtracts the digital chrominance signal SC from the digital composite color video signal to provide a digital luminance signal SY.

The digital luminance signal SY coming from the second subtracting circuit 109 is corrected in horizontal frequency characteristic by a horizontal frequency characteristic correcting circuit 120Y. The corrected digital luminance signal SY is then supplied to a D/A converter 26Y to be restored to the analog luminance signal Y.

The digital chrominance signal SC coming from the selector switch circuit 107 is corrected in horizontal frequency characteristic by a horizontal frequency characteristic correcting circuit 120C. The corrected digital chrominance signal SC is then supplied to a D/A converter 26C to be restored to the analog chrominance signal C.

As described, according to the comb filter of the present preferred embodiment, the chrominance signal output can be adaptively obtained according to the vertical correlation between the three horizontal scan lines. In the comb filter of the present preferred embodiment, the delay circuits for one horizontal period may only be the delay circuit 102 for the signal of 8-bit chrominance signal band and the delay circuit 116 for the 1-bit evaluation signal k0. Therefore, a total of nine bits of the delay circuits of one horizontal period may only be provided, thereby decreasing the circuit scale as compared with the ordinary arrangement of the two delay circuits for an 8-bit signal each.

The circuitry for detecting the presence or absence of vertical correlation may provided only for the input/output of the delay circuit 102. Therefore, the circuit constitution can be simplified and the circuit scale can be reduced as compared with the ordinary constitution having a correlation detecting block for detecting vertical correlation between the currently inputted scan line and the scan line one horizontal period before and another correlation detecting block for detecting vertical correlation between the scan line one horizontal period before and the scan line two horizontal periods before.

In the description made so far, the comb filter according to the present invention is applied to the television receiver. It will be apparent to those skilled in the art that the present invention is also applicable to other video apparatuses. FIG.

7 is a diagram illustrating a constitution of a VTR to which the comb filter according to the present invention is applied.

To be specific, a composite color video signal inputted through a video input terminal 31 is converted by an A/D converter 32 into a digital composite color video signal to be supplied to an adaptive comb filter 33 constituted by the comb filter 100 having the constitution shown in FIG. 1. As described before, a digital luminance signal DY and a digital chrominance signal DC are separated from the digital composite color video signal.

The digital luminance signal DY and the digital chrominance signal DC outputted from the adaptive comb filter 33 are restored by a D/A converter 34Y and a D/A converter 34C respectively into the analog luminance signal and the analog chrominance signal C. Then, these luminance signal and the chrominance signal are supplied to a recording processing circuit 35, in which the luminance signal is frequency modulated while the chrominance signal is frequency multiplexed on the low frequency side of the frequency modulated luminance signal. The resultant frequency multiplexed signal is supplied to a rotary head 36 to be recorded on magnetic tape.

In the above-mentioned preferred embodiment, the comb filter is a digital circuit and the A/D and D/A converters are externally attached to the comb filter. It will be apparent to those skilled in the art that the comb filter can incorporate these converters.

It will also be apparent to those skilled in the art that the comb filter may have an analog constitution.

As mentioned above and according to the present invention, a comb filter for adaptively obtaining chrominance signal output according to the vertical correlation between three horizontal scan lines can be realized with a smaller and simpler circuit constitution than the ordinary constitution.

While the preferred embodiment of the present invention has been described using specific terms, such description is for illustrative purposes only, and it is to be understood that changes and variations may be made without departing from the spirit or scope of the appended claims.

What is claimed is:

1. A comb filter comprising:
    a bandpass filter for receiving a composite color video signal, extracting a frequency band component of a chrominance signal from said composite color video signal, and outputting the extracted frequency band component;
    a first delay circuit for receiving the output of said bandpass filter and delaying said output by one horizontal period;
    a first subtracting circuit for obtaining a subtracted output between the output signal of said bandpass filter and an output signal of said first delay circuit;
    an adding circuit for obtaining an added output of the output signal of said bandpass filter and the output of said first delay circuit;
    a switching circuit for switching between the output of said bandpass filter and the output of said subtracting circuit and outputting the switched output;
    a correlation detecting circuit for receiving the output of said first subtracting circuit and the output of said adding circuit and, based on a relationship between the two outputs, outputting a binary signal that indicates correlation between the output signal of said bandpass filter and the output signal of said first delay circuit;
    a second delay circuit for delaying said binary signal coming from said correlation detecting circuit by one horizontal period; and
    an arithmetic circuit for receiving said binary signal from said correlation detecting circuit and the signal from said second delay circuit and, from an operational results of said binary signal and said signal from said second delay circuit, outputting a select signal for performing switching control on said switching circuit;
    wherein a chrominance signal is obtained from said switching circuit.

2. A comb filter as claimed in claim 1, further comprising:
    a third delay circuit to which said composite color video signal is supplied for delaying the same; and
    a second subtracting circuit for subtracting the output of said switching circuit from an output of said third delay circuit; wherein
    a luminance signal is obtained from said second subtracting circuit.

3. A video apparatus comprising:
    a comb filter for receiving a composite color video signal including a luminance signal and a chrominance signal, separating said luminance signal and said chrominance signal from said composite color video signal, and outputting the separated luminance signal and the separated chrominance signal;
    a signal processing circuit fro processing said luminance signal and said chrominance signal coming from said comb filter;
    said comb filter comprising;
    a bandpass filter for receiving said composite color video signal, extracting a frequency band component of said chrominance signal from said composite color video signal, and outputting the extracted frequency band component,
    a first delay circuit for receiving the output of said bandpass filter and delaying said output by one horizontal period,
    a first subtracting circuit for obtaining a subtracted output between the output signal of said bandpass filter and an output signal of said first delay circuit,
    an adding circuit for obtaining an added output of the output signal of said bandpass filter and the output of said first delay circuit,
    a switching circuit for switching between the output of said bandpass filter and the output of said subtracting circuit and outputting the switched output,
    a correlation detecting circuit for receiving the output of said first subtracting circuit and the output of said adding circuit and, based on a relationship between the two outputs, outputting a binary signal that indicates correlation between the output signal of said bandpass filter and the output signal of said first delay circuit,
    a second delay circuit for delaying said binary signal coming from said correlation detecting circuit by one horizontal period,
    an arithmetic circuit for receiving said binary signal from said correlation detecting circuit and the signal from said second delay circuit and, from an operational results of said binary signal and said signal from said second delay circuit, outputting a select signal for performing switching control on said switching circuit,
    a third delay circuit to which said composite color video signal is supplied for delaying the same, and
    a second subtracting circuit for subtracting the output of said switching circuit from an output of said third delay circuit,
    wherein said chrominance signal is obtained from said switching circuit and said luminance signal is obtained from said second subtracting circuit.

4. A video apparatus as claimed in claim 3, wherein said comb filter has a digital circuit constitution, an analog-to-digital converter is provided in the front stage of said bandpass filter, a digital-to-analog converter is provided in the rear stage of each of said switching circuit and said second subtracting circuit, and said second delay circuit is a delay circuit for one-bit information.

5. A video apparatus as claimed in claim 3, wherein said video apparatus is a television receiver.

6. A video apparatus as claimed in claim 3, wherein said video apparatus is a video tape recorder.

* * * * *